US008661227B2

(12) United States Patent
Abernathy et al.

(10) Patent No.: US 8,661,227 B2
(45) Date of Patent: *Feb. 25, 2014

(54) MULTI-LEVEL REGISTER FILE SUPPORTING MULTIPLE THREADS

(75) Inventors: Christopher M. Abernathy, Austin, TX (US); Mary D. Brown, Austin, TX (US); Hung Q. Le, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 623 days.

This patent is subject to a terminal disclaimer.

(21) Appl. No.: 12/884,411

(22) Filed: Sep. 17, 2010

(65) Prior Publication Data

US 2012/0072700 A1 Mar. 22, 2012

(51) Int. Cl.
*G06F 9/34* (2006.01)
(52) U.S. Cl.
USPC .......................................... 712/205; 712/215
(58) Field of Classification Search
USPC .......................................... 712/217, 205, 214
See application file for complete search history.

(56) References Cited

U.S. PATENT DOCUMENTS

| 6,263,416 | B1 | 7/2001 | Cherabuddi |
| 6,286,027 | B1 | 9/2001 | Dwyer, III et al. |
| 6,311,261 | B1 | 10/2001 | Chamdari et al. |
| 6,314,511 | B2 | 11/2001 | Levy et al. |
| 6,633,970 | B1 | 10/2003 | Clift et al. |
| 6,670,895 | B2 * | 12/2003 | Singh .............................. 341/50 |
| 6,862,664 | B2 | 3/2005 | Tramblay et al. |
| 7,143,267 | B2 | 11/2006 | Fluhr et al. |
| 7,155,599 | B2 | 12/2006 | Jourdan et al. |
| 7,284,092 | B2 * | 10/2007 | Nunamaker et al. .......... 711/122 |
| 7,409,503 | B2 | 8/2008 | Steely et al. |
| 7,506,139 | B2 | 3/2009 | Burky et al. |
| 7,523,266 | B2 | 4/2009 | Chaudhry et al. |
| 7,669,203 | B2 | 2/2010 | Samra et al. |

(Continued)

FOREIGN PATENT DOCUMENTS

WO 2004059472 A2 7/2004

OTHER PUBLICATIONS

Gummattira et al., "Register Hierarchy", Rice University, Depart of Computer Science and Electrical Engineering, 2002 Spring-ELEC-525, Advanced Microprocessor Architecture, Apr. 2002, pp. 1-9.*

(Continued)

*Primary Examiner* — Eric Coleman
(74) *Attorney, Agent, or Firm* — Yudell Isidore Ng Russell PLLC

(57) ABSTRACT

A processor includes an instruction fetch unit, an issue queue coupled to the instruction fetch unit, an execution unit coupled to the issue queue, and a multi-level register file including a first level register file having lower access latency and a second level register file having higher access latency. Each of the first and second level register files includes a plurality of physical registers for holding operands that is concurrently shared by a plurality of threads. The processor further includes a mapper that, at dispatch of an instruction specifying a source logical register from the instruction fetch unit to the issue queue, initiates a swap of a first operand associated with the source logical register that is in the second level register file with a second operand held in the first level register file. The issue queue, following the swap, issues the instruction to the execution unit for execution.

17 Claims, 5 Drawing Sheets

(56) References Cited

U.S. PATENT DOCUMENTS

| | | | |
|---|---|---|---|
| 7,711,898 B2 | 5/2010 | Sodani et al. | |
| 2004/0128448 A1 | 7/2004 | Stark et al. | |
| 2005/0120179 A1 | 6/2005 | Akkary et al. | |
| 2005/0204118 A1* | 9/2005 | Jen et al. | 712/225 |
| 2006/0020775 A1 | 1/2006 | Madriles et al. | |
| 2006/0059310 A1* | 3/2006 | Asher et al. | 711/126 |
| 2007/0083735 A1 | 4/2007 | Glew | |
| 2008/0082893 A1 | 4/2008 | Wang | |
| 2008/0133893 A1* | 6/2008 | Glew | 712/220 |
| 2008/0201563 A1 | 8/2008 | Dale et al. | |
| 2008/0276076 A1 | 11/2008 | Abernathy et al. | |
| 2009/0217013 A1 | 8/2009 | Caprioli | |

OTHER PUBLICATIONS

Cruz et al., "Multiple-Banked Register File Architectures", Proceedings of the 27th International Symposium on Computer Architecture, Jun. 2000, pp. 316-325.*

Rixner et al., "Register Organization for Media Processing", Proceedings of Sixth International Symposium on High-Performance Computer Architecture, Jan. 2000, pp. 375-386.*

Zeng et al., "Register File Caching for Energy Efficiency", Proceedings of International Symposium on Low Power Electronics and Design, Oct. 2006, pp. 244-249.*

Morrison, Roger; Lee, Ben; Lu, Shih-Lien; "Asymmetric Clustering Using a Register Cache"; Journal of Instruction-Level Parallelism 8 (2006) pp. 1-17; Feb. 2006.

Lo, Jack et al., 'Software-Directed Register Deallocation for Simultaneous Multithreaded Processors'; IEEE Transactions on Parallel and Distributed Systems (Sep. 1999); pp. 922-933; vol. 10(9).

Morrison, Robert; Lee, Ben; Lu, Shih-Lien; "Asymmetric Clustering Using a Register Cache"; Journal of Instruction-Level Parallelism 8 (2006) pp. 1-17; Feb. 2006.

U.S. Appl. No. 12/778,235 entitled "Register File Supporting Transactional Processing"; Non-final office action dated Apr. 8, 2013 (18 pp.).

Cruz, J. et al. "Multiple Banked Register File Architectures" 2000, ACM, pp. 316-325.

Balasubramonian, R., et al. "Reducing the Complexity of the Register File in Dynamic Superscalar Processors", 2001, IEEE, pp. 237-248.

Zalamea, J., et al. Hierarchical Clustered Register File Organization of VLIW Processors, 2003, IEEE, (10 pp.).

Lipasti, M.H., et al., "Physical Register Inlining", 2004, IEEE, (11 pp.).

Golander, et al.; "Checkpoint Allocation and Release; ACM Transactions on Architecture and Code Optimization", Tel-Aviv University, vol. 6, No. 3, Article 10, Sep. 2009, (27 pp).

Ergin, et al. "Early Register Deallocation Mechanisms Using Checkpoint Regiser Files"; IEEE Computer Society, IEEE Transactions on Computers, vol. 55, No. 9, Sep. 2006, pp. 1153-1166.

International Application PCT/EP2011/057269, International Search Report and Written Opinion dated Jul. 7, 2011 (8 pp.).

Albrecht, Carsten et al.; "Cooperative Software Multithreading to Enhance Utilization of Embedded Processors for Network Applications"; IEEE Proceedings of the 12th Euromicro Conference on Parallel, Distributed and Network-Based Processing (EUROMICRO-PDP 2004); pp. 1-8.

Emer, Joel; "Simultaneous Multlithreading: Multiplying Alpha Performance"; Compaq Computer Corporation (1999); pp. 1-23.

* cited by examiner

MULTI-LEVEL REGISTER FILE SUPPORTING MULTIPLE THREADS

BACKGROUND OF THE INVENTION

1. Technical Field

The present invention relates in general to data processing, and in particular, to a multi-threaded processor and data processing system having a multi-level register file for operand storage.

2. Description of the Related Art

The architected state of a hardware thread of a processor can be defined as the information that is required by a given processor architecture for the hardware thread to achieve an architecturally defined correct result from a current point of execution. In general, the architected state of a thread is defined by volatile data within the processor, such as the contents of various user level and supervisor level registers of the processor.

As the number of simultaneous hardware threads supported by processors has increased, the size of the register sets in the processors has also increased to provide storage for the architected state of each simultaneous hardware thread. Other factors, such as an increase in the size of data words (e.g., from 32 bits to 64 bits), have also increased the size of register sets. Because the access latency and power consumption of a given set of storage locations generally increases as the size of that set of storage locations grows, the increase in the size of register sets has become a performance concern in processor design.

The concern with the access latency and power consumption of register sets in processors has led to the introduction of a number of architectural developments in processors. For example, some architectures have introduced mirrored sets of certain architected registers that may be independently accessed. In addition, other architectures have adopted multi-level register files in an attempt to reduce the size of at least one level of register storage. While such developments have been generally provided benefits, these developments have not heretofore provided a solution that scales well with the number of simultaneous hardware threads.

SUMMARY OF THE INVENTION

In one embodiment, a processor includes an instruction fetch unit, an issue queue coupled to the instruction fetch unit, an execution unit coupled to the issue queue, and a multi-level register file including a first level register file having lower access latency and a second level register file having higher access latency. Each of the first and second level register files includes a plurality of physical registers for holding operands that is concurrently shared by a plurality of threads. The processor further includes a mapper that, at dispatch of an instruction specifying a source logical register from the instruction fetch unit to the issue queue, initiates a swap of a first operand associated with the source logical register that is in the second level register file with a second operand held in the first level register file. The issue queue, following the swap, issues the instruction to the execution unit for execution.

DETAILED DESCRIPTION OF ILLUSTRATIVE EMBODIMENT

Figure 1:
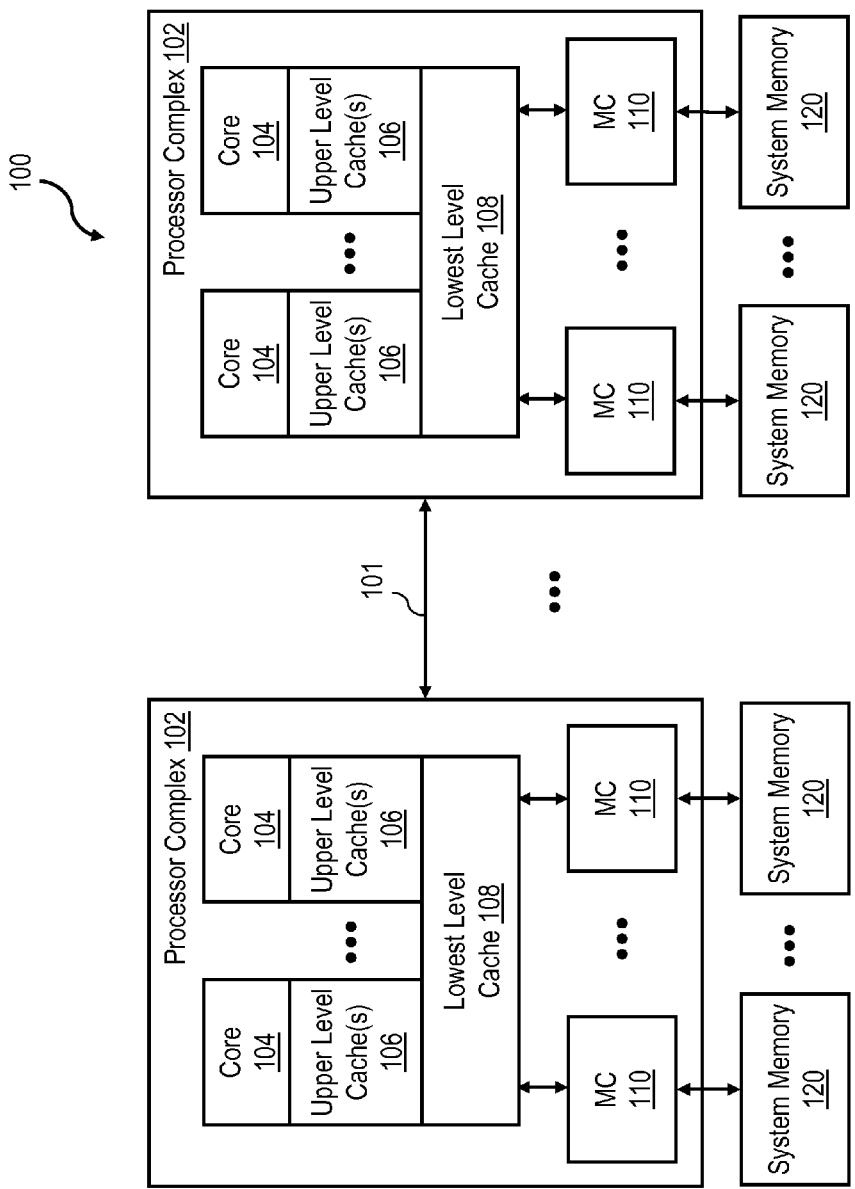
FIG. 1 is high level block diagram of an exemplary data processing system in accordance with one embodiment.

With reference now to FIG. 1, there is illustrated a high level block diagram of an exemplary data processing system 100 according to one embodiment. Data processing system 100 includes one or more (and in some embodiments, a multiplicity of) processor complexes 102 coupled for communication by a interconnect fabric 101, which may include, for example, one or more buses and/or switches.

Processor complexes 102, which may be implemented, for example, as chip multiprocessors (CMPs) or multi-chip modules (MCMs), each include at least one processor core 104 for processing data under the direction of program instructions. Each processor core 104 is capable of simultaneously executing multiple independent hardware threads of execution.

Each processor core 104 is supported by a memory hierarchy including one or more upper level caches 106 and a lowest level cache 108. As will be appreciated by those skilled in the art, such caches provide processor cores 104 with low latency access to instructions and data retrieved from system memory. While it is typical for at least the highest level cache (i.e., that with the lowest access latency) to be on-chip with the associated core 104, the lower levels of cache memory (including lowest level cache 108) may be implemented as on-chip or off-chip, in-line or lookaside cache, which may be fully inclusive, partially inclusive, or non-inclusive of the contents the upper levels of cache. As indicated, the lowest-level cache 108 can be (but is not required to be) shared by multiple processor cores 104, and further can optionally be configured as a victim cache.

Processor complex 102 additionally includes one or more memory controllers (MCs) 110 each controlling read and write access to system (or main) memory, which is the lowest level of storage addressable by the real address space of processor complex(es) 102. In an exemplary embodiment, each memory controller 110 is coupled to at least one respective system memory 120.

As will be appreciated, data processing system 100 may further include additional unillustrated components, such as network interface cards, input/output (I/O) adapters, non-volatile data storage, additional bus bridges, etc., as is known in the art.

Figure 2:
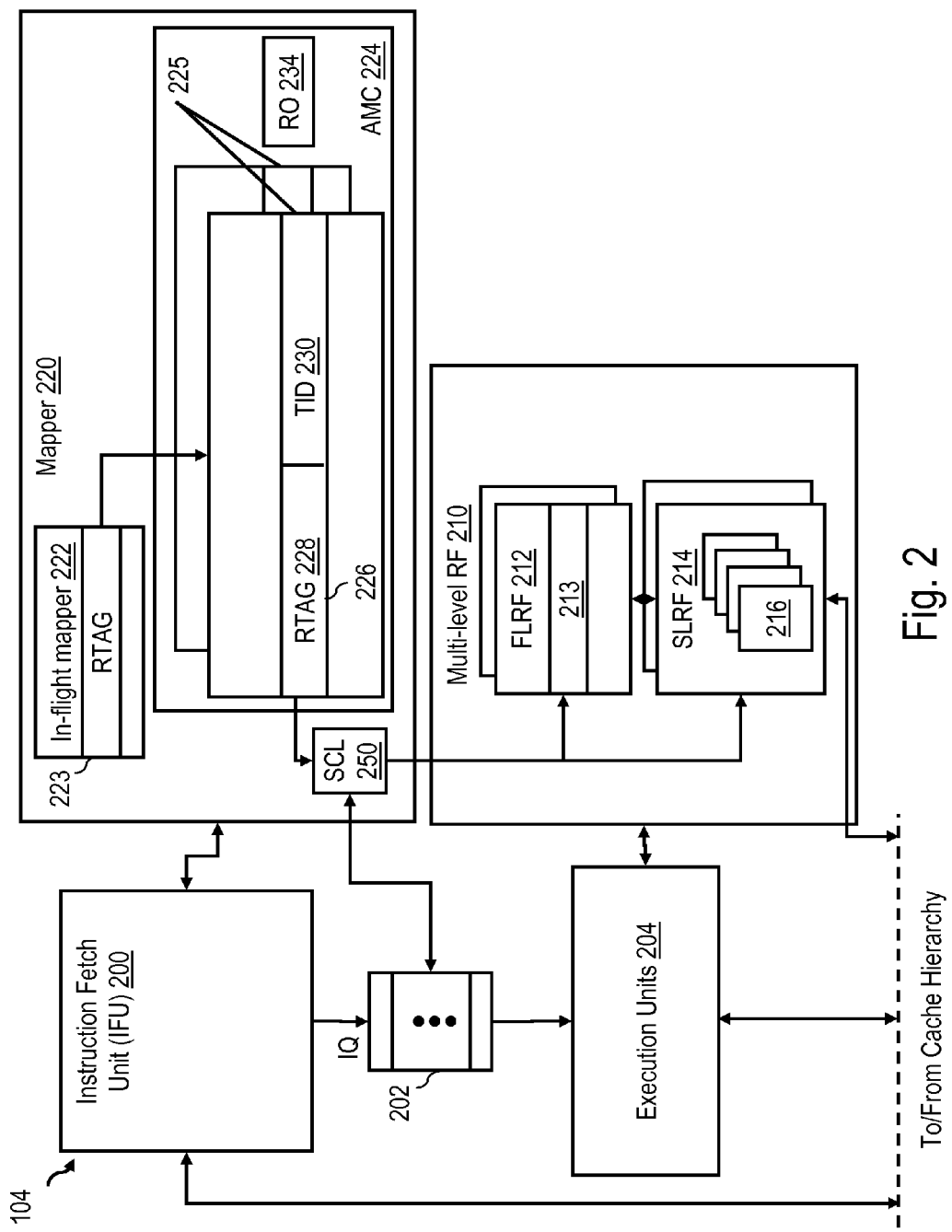
FIG. 2 is a more detailed view of a processor core of the data processing system of FIG. 1.

Referring now to FIG. 2, there is depicted a more detailed view of a processor core of data processing system 100 of FIG. 1. Each processor core 104 includes an instruction fetch unit (IFU) 200 for fetching and ordering instructions for execution in multiple concurrent hardware threads. IFU 200 is coupled to an issue queue 202 to which IFU 200 dispatches instructions and from which instructions are issued, possibly out-of-order, to execution units 204 for execution. While these instructions may take various forms for different instruction types or in different instruction set architectures, instructions may take the form:

opcode RT, RA, RB where opcode is the operation code of the instruction, RT, if present, identifies a logical destination (target) register that will receive the execution result (destination operand) of the instruction, and RA and RB, if present, identify the logical source register(s) that provide source operands of the instruction.

Execution units 204 execute instructions in multiple hardware threads simultaneously. In at least some embodiments, execution units 204 may execute at least some instructions within a given hardware thread out-of-order and may further employ known techniques of speculation and branch prediction to enhance cycles-per-instruction (CPI) performance.

Coupled to execution units 204 is a multi-level register file (RF) 210 for storing source and destination (target) operands of instructions executed by execution units 204. In the depicted embodiment, multi-level register file 210 includes one or more first level register files (FLRFs) 212, which in a typical embodiment each contain a plurality of physical registers 213 for storing a respective type of register value, such as fixed-point values, floating-point values, vector values, decimal values, condition code values, count values, etc. Each first level register file 212 is preferably shared by all of the simultaneous hardware threads of processor core 104. Thus, for example, all simultaneous hardware threads of processor core 104 preferably share a common first level general purpose register file for storing fixed-point values. The contents of each first level register file 212 preferably include both architected register values, which represent the current non-speculative state of threads, as well as non-architected register values, which represent working or "in-flight" values not yet committed to the architected state of the thread. The depth of (i.e., number of registers in) each first level register file(s) 212 is preferably limited to a size determined to provide adequate storage capacity for the number of supported threads while meeting desired access latency and/or power consumption targets.

Multi-level register file 210 additionally includes one or more additional levels of physical register storage having successively larger storage capacities and higher access latencies than first level register file(s) 212. In the depicted embodiment, multi-level register file 210 includes one or more second level register files (SLRFs) 214, for example, one for each type of register value (e.g., fixed-point, floating-point/vector, condition code, count, etc.). In one embodiment, each second level register file 214 contains multiple register sets 216, each of which provides a plurality of physical registers for storing architected register values for a respective subset of the simultaneous threads supported by processor core 104 (e.g., a first register set 216 for threads 0-3, a second register set for threads 4-7, etc.). As further shown in FIG. 2, additional levels of even higher latency storage for architected register values can optionally be provided by the memory hierarchy (i.e., cache memories 106, 108 and/or system memory 120), which can serve as a backing store for the contents of multi-level register file 210.

Because first level register file(s) 212 contain fewer physical registers 213 than would be necessary to provide storage for the operands of all instructions concurrently undergoing execution in the simultaneous threads of processor core 104, processor core 104 includes a mapper 220 including data structures and logic to track architected and non-architected register values in processor core 104 by mapping logical registers referenced by instructions executed in execution units 202 to particular physical registers 213 in first level register file 212. Specifically, the depicted embodiment of mapper 220 includes a unified in-flight mapper 222 including a plurality of entries 223 that track, for all simultaneous threads, the physical registers 213 in first level register file 212 allocated as destination registers for in-flight instructions that have not yet committed execution results to the architected state of processor core 104. As indicated, the physical register 213 in first level register file 212 allocated as the destination register of a particular instruction is indicated by placing the register tag (RTAG) of the physical register 213 in the entry 223 of in-flight mapper 222 assigned to that particular in-flight instruction.

In addition, mapper 220 includes a mapping data structure to track the assignment of physical registers 213 in first level register file 212 to architected logical registers referenced by instructions across all simultaneous threads. In the depicted embodiment, this data structure is implemented as a shared architected mapper cache (AMC) 224 including a plurality of rows 225 each containing multiple entries 226. Rows 225 of AMC 224 are indexed by architected logical register (LREG), or alternatively, a subset of the bits comprising an LREG. In a processor core 104 supporting SMT, first level register file 212 can contain multiple physical registers 213 for the different threads corresponding to the same LREG or LREG group specified by the row index. Consequently, each row 225 of AMC 224 may contain multiple mappings for a given LREG or LREG group across all of the multiple simultaneous hardware threads. Each row 225 of AMC 224 has a respective associated replacement order vector 234 indicating a replacement order of its entries 226 in accordance with a selected replacement methodology (e.g., least recently used (LRU)). Replacement order vector 234 is preferably updated when a row 225 is accessed at instruction dispatch (if the source logical register of the dispatched instruction hits in AMC 224 and misses in in-flight mapper 222), at completion of an instruction having a destination logical register mapped by AMC 224, and when a swap request (discussed below) that accesses AMC 224 is issued.

As shown, an entry 226 in AMC 224 may include a number of fields, including an RTAG field 228 identifying a physical register 213 in first level register file 212 mapped by that architected entry 226, as well as a thread ID field 230 identifying the hardware thread currently using the identified physical register 213. The architected logical register currently mapped to the physical register 213 indicated by RTAG field 228 can be explicitly indicated by an additional field in entry 226, or alternatively, can be implicitly indicated by the index into AMC 224 associated with the entry 226.

Mapper 220 further includes swap control logic (SCL) 250, which manages the transfer of operands between first level register file 212 and second level register file 214, as discussed further below. In one preferred embodiment, SCL 250 can be implemented utilizing a First In First Out (FIFO) queue that holds operand transfer requests of mapper 220 until they are serviced.

Figure 3:
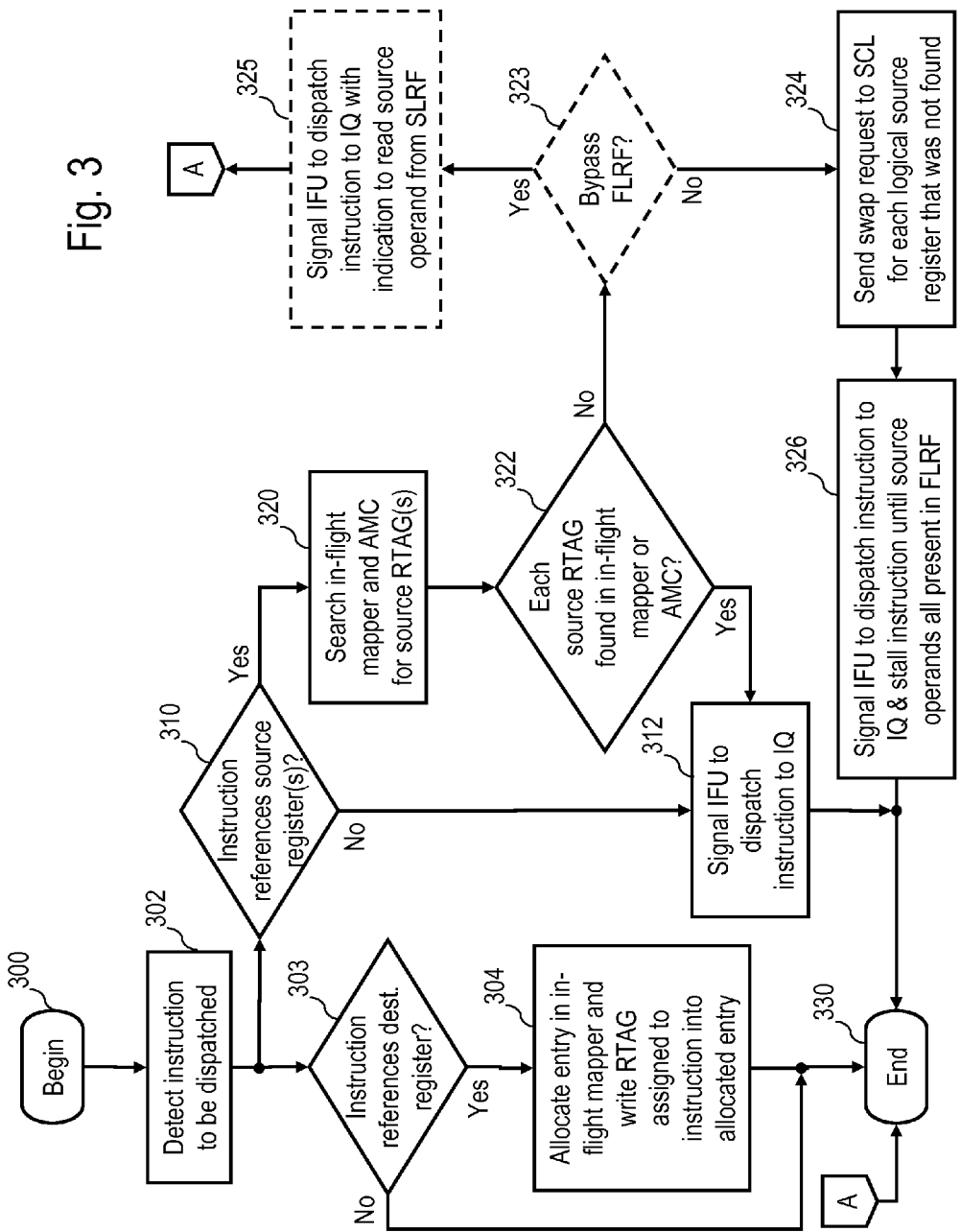
FIG. 3 is a high level logical flowchart of an exemplary process by which the mapper of FIG. 2 allocates physical registers in a multi-level register file to instruction operands at dispatch time in one embodiment.

With reference now to FIG. 3, there is illustrated a high level logical flowchart of an exemplary process by which mapper 220 allocates physical registers in multi-level register file 210 to instruction operands at dispatch time in one embodiment. As a logical flowchart, FIG. 3 presents steps in a logical rather than strictly chronological sequence, meaning that in at least some embodiments certain of the illustrated steps can be performed in a different order than illustrated and/or in parallel.

The exemplary process depicted in FIG. 3 begins at block 300 and then proceeds to block 302, which depicts mapper 220 detecting an instruction to be dispatched by instruction fetch unit 200 to issue queue 202. Following block 302, the process proceeds to both block 303 and block 310. Block 303 represents mapper 220 determining whether or not the detected instruction requires a destination register for its execution result. If not, the branch of the process depicted in FIG. 3 ends at block 330. If, however, mapper 220 determines at block 303 that the detected instruction requires a destination register, the process proceeds from block 303 to block 304, which illustrates mapper 220 allocating an entry 223 in in-flight mapper 222 for the instruction and writing the RTAG of a physical register 213 for holding the destination operand of the detected instruction into the allocated entry 213. Following block 304, that branch of the process depicted in FIG. 3 ends at block 330.

Referring now to the branch of the process including block 310 and the following blocks, mapper 220 also ensures availability of the source operands, if any, of the instruction to be dispatched. At block 310, mapper 220 examines the detected instruction to determine whether or not the detected instruction references any logical source registers. If mapper 220 determines that the instruction to be dispatched does not reference any logical source registers, the process proceeds from block 310 to block 312, which depicts mapper 220 signaling IFU 200 to dispatch the detected instruction to issue queue 202. In response to the signal depicted at block 312, IFU 200 dispatches the instruction to issue queue 202, from which the instruction may be issued to executions units 204 in an opportunistic fashion. Following block 312, the process shown in FIG. 3 terminates at block 330.

Returning to block 310, in response to a determination by mapper 220 that the detected instruction references one or more logical source registers, mapper 220 searches in-flight mapper 222 and AMC 224 for the source RTAG(s) corresponding to the referenced logical source register(s) (block 320). The RTAG associated with a given logical source register can be determined, for example, by reading RTAG field 228 of the entry 226 in AMC 224 indexed by the logical source register. At block 322, mapper 220 determines whether or not each such source RTAG was found in in-flight mapper 222 or AMC 224. If so, all source operands of the instruction under consideration are currently or will become available in first level register file 212 for execution of the detected instruction. Consequently, in this case, the process proceeds from block 322 to block 312, which as described above illustrates mapper 220 signaling IFU 200 to dispatch the detected instruction to instruction queue 202. It should be noted that in cases in which the source RTAG is found at multiple locations in in-flight mapper 222 and AMC 224, the youngest instance of the register value is associated with the detected instruction. The process shown in FIG. 3 thereafter terminates at block 330.

Returning to block 322, in response to a determination that at least one source logical register referenced by the instruction was not mapped by in-flight mapper 222 or AMC 224, mapper 220 optionally determines at block 323 whether or not to permit the read of the source operand to bypass first level register file 212 and directly access second level register file 214. Bypassing first level register file 212 in this manner is appropriate if the performance of the hardware thread containing the instruction has a lower priority and/or the logical source register is unlikely to again be accessed with temporal locality (e.g., the instruction belongs to an interrupt handler and/or the source logical register is infrequently referenced). As will be appreciated, if the source operand is read directly from second level register file 214 rather than from first level register file 212, the cycles-per-instruction (CPI) performance of the instruction consuming the source operand will decrease slightly (because of the higher access latency of second level register file 214), but "pollution" of AMC 224 and first level register file 212 with less useful data is avoided. In various embodiments, mapper 220 can make the optional determination depicted at block 323 based upon extrinsic information, such as compiler-generated hints appended to instructions, and/or information internal to processor core 104, such as thread priorities or historical patterns of reference to source logical registers.

In response to mapper 220 determining at optional block 323 that the read of the source operand will be permitted to bypass first level register file 212, the process proceeds to optional block 325, which depicts mapper 220 signaling IFU 200 to dispatch the detected instruction to issue queue 202 and to mark the instruction with an indication that the source operand is to be read directly from second level register file 214. Thereafter, the process depicted in FIG. 3 passes through page connector A and ends at block 330.

In response to a negative determination at optional block 323 or in response to a negative determination at block 322 in embodiments omitting optional block 323, the process shown in FIG. 3 proceeds to block 324. Block 324 illustrates mapper 220 sending a swap request for the source operand to SCL 250. The swap request requests that the source operand be retrieved from second level register file 214 (or from the memory hierarchy) and swapped with an operand contained in the entry 226 of first level register file 212 identified by replacement order vector 234 (e.g., the LRU entry 226), as described further below with reference to FIG. 5. The process of FIG. 3 proceeds from block 324 to block 326, which illustrates mapper 220 signaling IFU 200 to dispatch the detected instruction to issue queue 202 and to mark the instruction in issue queue 202 such that issuance of the instruction is stalled until the source operand(s) required for the instruction's execution are all present in first level register file 212. Thereafter, the process depicted in FIG. 3 ends at block 330.

Figure 4:
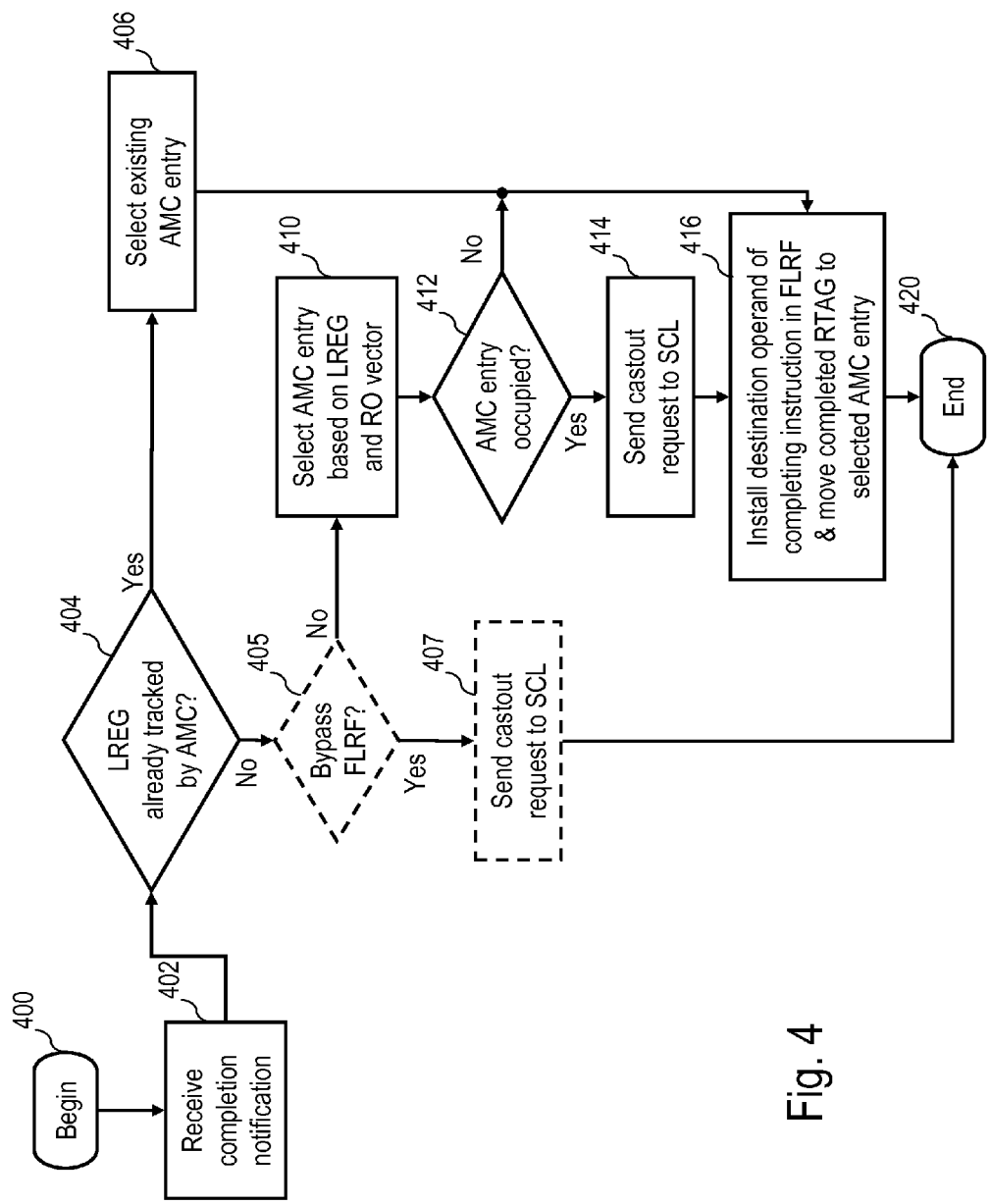
FIG. 4 is a high level logical flowchart of an exemplary process by which the mapper of FIG. 2 handles destination (target) operands of instructions at completion time in one embodiment.

Referring now to FIG. 4, there is depicted a high level logical flowchart of an exemplary process by which mapper 220 handles destination operands of instructions at completion time in one embodiment. The process begins at block 400 and thereafter proceeds to block 402, which depicts mapper 220 receiving from an execution unit 204 an indication that an instruction that references a logical destination register has finished execution and is ready for completion. In response to the completion notification, mapper 220 selects an entry 226 in AMC 224 to allocate for tracking the destination operand of the instruction.

In a preferred embodiment, mapper 220 selects the entry 226 to allocate by determining at block 404 whether or not the logical destination register (LREG) of the completing instruction is already mapped by an entry 226 of AMC 224. If so, mapper 220 selects that entry 226 of AMC 224 for allocation to track the destination operand of the instruction, as shown at block 406. The process then proceeds from block 406 to block 416, which depicts mapper 220 installing the destination operand of the completing instruction in the physical register 213 of first level register file 212 identified by the RTAG contained in the entry 223 of in-flight mapper 222 associated with the completing instruction. In addition, mapper 220 moves the associated RTAG from the entry 223 of in-flight mapper 222 to the RTAG field 228 of the selected entry 226 in AMC 224, overwriting the previous RTAG and deallocating the physical register 213 of first level register file 212 identified by the previous RTAG.

Returning to block 404, if mapper 220 determines that the logical destination register of the completing instruction is not tracked by an existing entry 226 of AMC 224, the process proceeds to optional block 405. Block 405 depicts mapper 220 determining whether or not the destination operand of the completing instruction should bypass first level register file 212 and be written directly into second level register file 214. As discussed above with reference to block 323 of FIG. 3, mapper 210 determines that bypassing first level register file 212 in this manner is appropriate, for example, if the performance of the hardware thread containing the completing instruction has a lower priority and/or the destination logical register is unlikely to again be accessed with temporal locality. Mapper 210 may again make the determination depicted at block 405 based upon a compiler-supplied hint appended to the completing instruction and/or information available within processor core 104 (e.g., whether the logical destination register is referenced by a subsequent in-flight instruction). In response to mapper 210 determining at block 405 that the destination operand should not bypass first level register file 212, the process passes from block 405 to block 410, which is described below. If, however, mapper 210 determines at block 405 that the destination operand should bypass first level register file 212, mapper 210 sends to SCL 250 a request to castout the RTAG assigned to the destination operand of the completing instruction (block 407). In this manner, the destination operand will bypass first level register file 212 and be written directly to second level register file 214, as described further below with reference to FIG. 5. Following block 407, the process depicted in FIG. 4 ends at block 420.

In response to a negative determination at block 405 or in response to a negative determination at block 404 in embodiments in which optional block 405 is omitted, the process proceeds to block 410. Block 410 depicts mapper 220 selecting an entry 226 of AMC 224 in the row 225 indexed by the logical destination register (LREG) of the completing instruction based upon the RO vector 234 of the indexed row 225. At block 412, mapper 220 determines whether or not the selected AMC entry 226 (and hence the associated physical register 213) is currently occupied. If not, the process passes to block 416, which is described below. If, however, the selected AMC entry 226 is occupied, a castout from first level register file 212 is required to preserve the register value of the physical register 213 in first level register file 212 currently mapped by the entry 226 in AMC 224. Accordingly, at block 414 mapper 220 sends to SCL 250 a request to castout the contents of the physical register 213 in first level register file 212 mapped by the selected entry 226 in AMC 224. After the register value is removed from first level register file 212, mapper 220 installs the destination operand of the completing instruction in the physical register 213 of first level register file 212 identified by the RTAG contained in the entry 223 of in-flight mapper 222 associated with the completing instruction, as shown at block 416. In addition, mapper 220 moves the associated RTAG from the entry 223 of in-flight mapper 222 to the RTAG field 228 of the selected entry 226 in AMC 224, overwriting the previous RTAG and deallocating the physical register 213 of first level register file 212 identified by the previous RTAG. It should be noted that the RTAG can be transferred to the selected entry 226 of AMC 224 immediately on a completion, provided the castout request is queued to SCL 250). Following block 416, the process of FIG. 4 ends at block 420.

Figure 5:
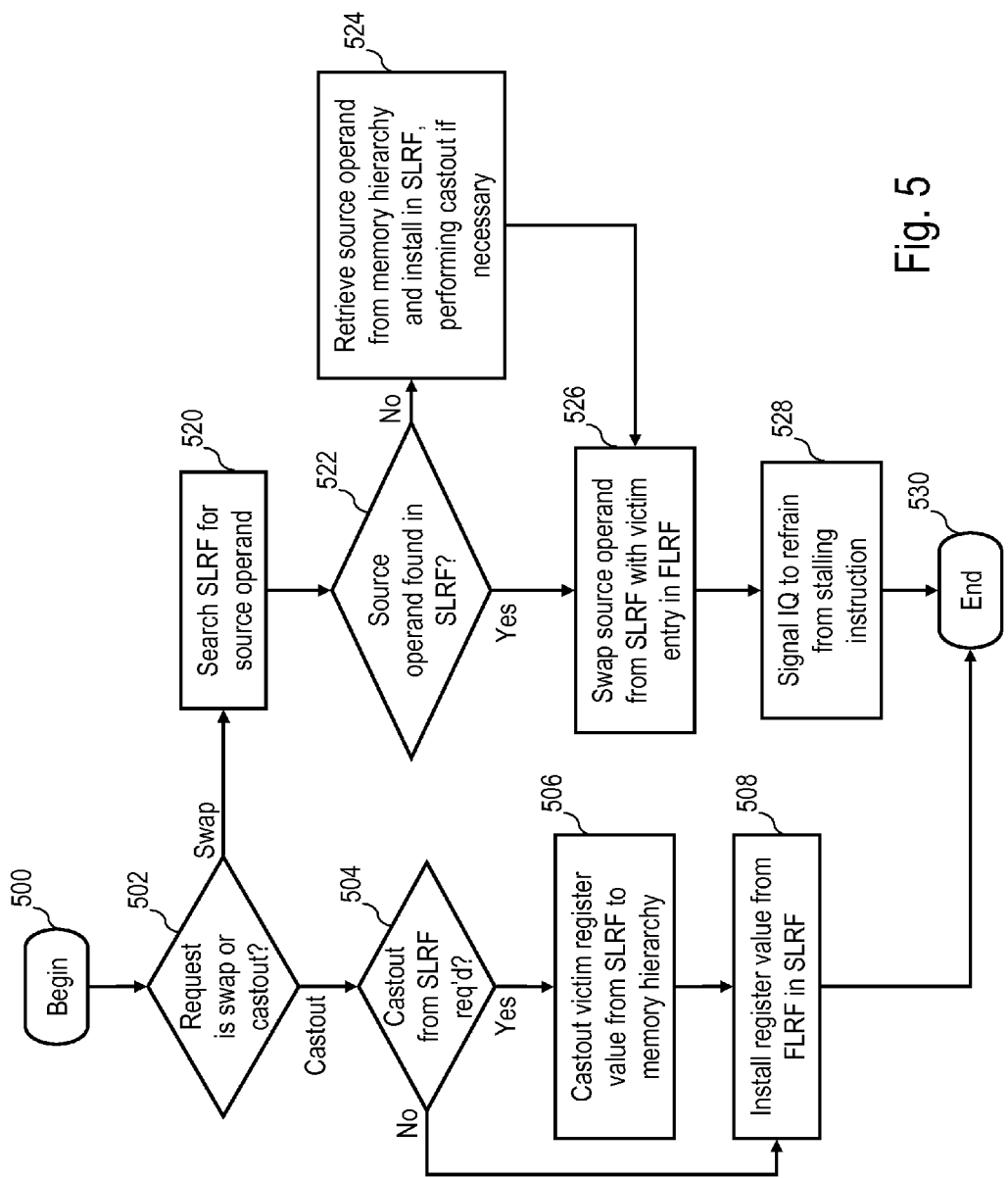
FIG. 5 is a high level logical flowchart of an exemplary process by which the swap control queue (SCL) of FIG. 2 controls the transfer of register values between various levels of register storage in accordance with one embodiment.

With reference now to FIG. 5, there is depicted a high level logical flowchart of an exemplary process by which SCL 250 transfers register values between various levels of register storage in accordance with one embodiment. The process begins at block 500 and thereafter proceeds to block 502, which depicts SCL 250 determining whether a next operand transfer request to be processed is a swap request (as described at block 324 of FIG. 3) or a castout request (as described at blocks 407 and 414 of FIG. 4). If SCL 250 determines that the operand transfer request to be processed is a swap request, SCL 250 services the swap request as depicted at block 520 and following blocks, which are described below. If, on the other hand, SCL 250 determines at block 502 that the request to be processed is a castout request, SCL 250 services the castout request as depicted at block 504 and following blocks.

Referring first to block 504, in servicing a castout request SCL 250 determines whether or not a castout from second level register file 214 to the memory hierarchy is required to free storage for the register value castout from first level register file 212. A castout is required if second level register file 214 does not have sufficient storage for the architected state of all simultaneous threads of processor core 104 and the victim register in second level register file 214 selected to hold the register value specified by the castout request is occupied. However, in some embodiments of processor core 104, castouts from second level register file 214 to the memory hierarchy are rendered unnecessary by implementing second level register file 214 with sufficient storage capacity to hold all of the architected register values of all of the simultaneous threads in processor core 104. Accordingly, in one preferred embodiment, second level register file 214 is implemented with a physical register per thread for each logical register in the instruction set architecture of processor core 104, with each such physical register being indexed by the corresponding logical register and thread ID.

If SCL 250 determines at block 504 that no castout from second level register file 214 is required, the process proceeds to block 508, which is described below. If, however, SCL 250 determines at block 504 that a castout from second level register file 214 is necessary, SCL 250 initiates a castout of the register value of a victim register (e.g., the LRU register) in the relevant register set 216 of second level register file 214 to the memory hierarchy to free storage for the register value castout from first level register file 212 (block 506). Thereafter, at block 508, SCL 250 installs the register value castout from first level register file 212 into the appropriate physical register of second level register file 214 (i.e., the physical register indexed by the logical register associated with the register value castout from first level register file 212). It should be noted that issue queue 202 is preferably notified of each logical register being castout from first level register file 212, in case issue queue 202 contains an instruction awaiting issue that has the logical register as an operand source. In at least some embodiments, issue queue 202 may still issue such instructions, but does so with an indication that the source operand is to be read directly from second level register file 214. Alternatively, issue queue 202 may respond to such castout notifications by issuing a swap request requesting each logical source register affected by a castout request to be restored to first level register file 212. The process given in FIG. 5 thereafter terminates at block 530.

Referring now to block 520, if SCL 250 determines that the request is a swap request, SCL 250 searches second level register file 214 for the source operand, for example, by indexing into second level register file 214 utilizing the source logical register as an index. If SCL 250 determines at block 522 that the source operand is found in second level register file 214, the process proceeds to block 526, which is described below. However, if SCL 250 determines at block 522 that the source operand is not found in second level register file 214, SCL 250 initiates retrieval of the source operand from the memory hierarchy and installation of the source operand in second level register file 214 (block 524). SCL 250 additionally performs a castout from second level register file 214 to the memory hierarchy, if necessary to provide storage for the requested source operand. The process then proceeds from block 524 to block 526.

Block 526 depicts SCL 250 initiating a swap of the source operand in second level register file 214 that is required for instruction execution with the register value of the physical register 213 in first level register file 212 specified by the RTAG field 228 of the AMC entry 226 identified by the logical register (LREG) of the requesting source (since the AMC is indexed by LREG) and replacement order vector 234. SCL 250 additionally updates the corresponding AMC entry 226 accordingly. As indicated at block 528, SCL 250 then signals instruction queue 202 to refrain from stalling the instruction requiring the source operand, thus freeing the instruction to be opportunistically issued from issue queue 202 to execution units 204.

Again, it should be noted that the issue queue is preferably notified of the logical register being victimized by the swap from first level register file 212, in case issue queue 202 contains an instruction awaiting issue that has the logical register as an operand source. In at least some embodiments, issue queue 202 may respond to such swap notifications by issuing a swap request requesting each logical source register affected by such a swap request to be restored to first level register file 212. Alternatively, issue queue 202 may still issue an instruction with which a swap request collides without issuing an additional swap request. In this case, issue queue 202 issues the instruction with an indication that the source operand is to be read directly from second level register file 214. This bypass technique can additionally be utilized to handle situations in which a requested swap is not performed for any reason (e.g., register file port conflicts, a collision with a register in the castout pipeline, etc.). In such cases, the instruction waiting in issue queue 202 can be issued with an indication to read the source operand directly from second level register file 214 without performing a swap. Following block 528, the process depicted in FIG. 5 ends at block 530.

As has been described, in one embodiment, a processor includes an instruction fetch unit, an issue queue coupled to the instruction fetch unit, an execution unit coupled to the issue queue, and a multi-level register file including a first level register file having lower access latency and a second level register file having higher access latency. Each of the first and second level register files includes a plurality of physical registers for holding operands that is concurrently shared by a plurality of threads. The processor further includes a mapper that, at dispatch of an instruction specifying a source logical register from the instruction fetch unit to the issue queue, initiates a swap of a first operand associated with the source logical register that is in the second level register file with a second operand held in the first level register file. The issue queue, following the swap, issues the instruction to the execution unit for execution.

While one or more preferred embodiments have been shown and described, it will be understood by those skilled in the art that various changes in form and detail may be made therein without departing from the spirit and scope of the appended claims. For example, although certain aspects have been described with respect to a logic that directs particular functions herein disclosed, it should be understood that such functions can alternatively be implemented by a program product including a computer-readable storage medium storing program code that can be processed by a data processing system. Without limitation, the program product can include, for example, an optical or magnetic disk or non-volatile memory that encodes software or firmware that can be processed by a computer or component thereof to perform some or all of the described functions.

Further, the program product may include a computer readable storage medium storing data and/or instructions that, when executed or otherwise processed on a data processing system, generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog® and Very High Speed Integrated Circuit (VHSIC) Hardware Description Language (VHDL), and/or higher level design languages such as C or C++. Furthermore, the data and/or instructions may also employ a data format used for the exchange of layout data of integrated circuits and/or symbolic data format (e.g., information stored in a Graphic Data System (GDS II or GDS2), Graphics Language 1 (GL1), Open Artwork System Interchange Standard (OASIS), map files, or any other suitable format for storing such design data structures).

What is claimed is:

1. A processor, comprising:
   an instruction fetch unit;
   an issue queue coupled to the instruction fetch unit that receives instructions dispatched from the instruction fetch unit;
   an execution unit, coupled to the issue queue, that executes instructions issued from the issue queue, wherein the instructions executed by the execution unit reference a plurality of architected logical registers;
   a multi-level register file including a first level register file having a lower access latency and a second level register file having a higher access latency, wherein each of the first and second level register files individually includes a plurality of physical registers for holding operands that is concurrently shared by a plurality of hardware threads; and
   a mapper including:
      a first data structure including a plurality of entries each assigning an identifier of a physical register in the first-level register file to a respective one of a plurality of instructions undergoing execution, wherein the first data structure is a shared data structure concurrently containing entries for instructions in multiple of the plurality of hardware threads; and
      a second data structure that records variable assignments between the plurality of architected logical registers and physical registers in the first level register file;
      wherein the mapper, at dispatch from the instruction fetch unit to the issue queue of an instruction specifying a source logical register among the plurality of architected logical registers, initiates a swap of a first operand that is associated with the source logical register and that is in the second level register file with a second operand held in the first level register file and updates the second data structure accordingly;
   wherein the issue queue, in response to a signal from the mapper indicating the first operand is present in the first level register file, issues the instruction to the execution unit for execution.

2. The processor of claim 1, wherein:
   the mapper initiates the swap in response to a determination that the first data structure does not include an entry assigning a physical register in the first level register file to the first operand.

3. The processor of claim 1, wherein the mapper selects the second operand utilizing a replacement order vector.

4. The processor of claim 1, wherein:
the mapper initiates the swap in response to determining not to bypass the first level register file; and
the issue queue issues the instruction for execution with an indication to read the first operand directly from the second level register file in response to determining to bypass the first level register file.

5. The processor of claim 1, wherein the mapper indexes into the second level register file to perform the swap utilizing an identifier of the source logical register.

6. The processor of claim 1, wherein:
the mapper, at completion of the instruction, initiates a castout of a third operand from the first level register file to transfer the third operand from the first level register file to the second level register file in response to the first data structure not currently tracking a physical register in the first level register file allocated to hold a fourth operand produced by execution of the instruction.

7. The processor of claim 1, wherein:
the issue queue stalls issuance of the instruction from the issue queue until the swap has completed and thereafter issues the instruction to the execution unit for execution in response to an indication that the swap has completed.

8. The processor of claim 1, and further comprising a cache hierarchy that serves as a backing store for the second level register file, wherein the mapper, responsive to not finding the source operand in the second level register file, initiates retrieval of the source operand from the cache hierarchy and installation of the source operand in the second level register file.

9. A data processing system, comprising:
a system memory;
a plurality of processor cores coupled for communication with the system memory, wherein a processor core among the plurality of processor cores includes:
an instruction fetch unit;
an issue queue coupled to the instruction fetch unit that receives instructions dispatched from the instruction fetch unit;
an execution unit, coupled to the issue queue, that executes instructions issued from the issue queue, wherein the instructions executed by the execution unit reference a plurality of architected logical registers;
a multi-level register file including a first level register file having a lower access latency and a second level register file having a higher access latency, wherein each of the first and second level register files individually includes a plurality of physical registers for holding operands that is concurrently shared by a plurality of hardware threads; and
a mapper including:
a first data structure including a plurality of entries each assigning an identifier of a physical register in the first-level register file to a respective one of a plurality of instructions undergoing execution, wherein the first data structure is a shared data structure concurrently containing entries for instructions in multiple of the plurality of hardware threads; and
a second data structure that records variable assignments between the plurality of architected logical registers and physical registers in the first level register file;
wherein the mapper, at dispatch from the instruction fetch unit to the issue queue of an instruction specifying a source logical register among the plurality of architected logical registers, initiates a swap of a first operand that is associated with the source logical register and that is in the second level register file with a second operand held in the first level register file and updates the second data structure accordingly;
wherein the issue queue, in response to a signal from the mapper indicating the first operand is present in the first level register file, issues the instruction to the execution unit for execution.

10. The data processing system of claim 9, wherein:
the mapper initiates the swap in response to a determination that the first mapping data structure does not include an entry assigning a physical register in the first level register file to the first operand.

11. The data processing system of claim 9, wherein the mapper selects the second operand utilizing a replacement order vector.

12. The data processing system of claim 9, wherein:
the mapper initiates the swap in response to determining not to bypass the first level register file; and
the issue queue issues the instruction for execution with an indication to read the first operand directly from the second level register file in response to determining to bypass the first level register file.

13. The data processing system of claim 9, wherein the mapper indexes into the second level register file to perform the swap utilizing an identifier of the source logical register.

14. The data processing system of claim 9, wherein:
the mapper, at completion of the instruction, initiates a castout of a third operand from the first level register file to transfer the third operand to the second level register file in response to the first mapping data structure not currently tracking a physical register in the first level register file allocated to hold a fourth operand produced by execution of the instruction.

15. The data processing system of claim 9, wherein:
the issue queue stalls issuance of the instruction from the issue queue until the swap has completed and thereafter issues the instruction to the execution unit for execution in response to an indication that the swap has completed.

16. The data processing system of claim 9, and further comprising a cache hierarchy that serves as a backing store for the second level register file, wherein the mapper, responsive to not finding the source operand in the second level register file, initiates retrieval of the source operand from the cache hierarchy and installation of the source operand in the second level register file.

17. A program product, comprising:
a computer-readable memory; and
program code stored on the computer-readable memory that, when processed by a computer, causes the computer to model processor operation by performing:
in a simulated processor, holding operands of a plurality of hardware threads of the simulated processor in a shared first level register file having a lower access latency and holding operands of the plurality of hardware threads in a shared second level register file having a higher access latency;
in a mapper of the simulated processor, maintaining:
a first data structure including a plurality of entries each assigning an identifier of a physical register in the first-level register file to a respective one of a plurality of instructions undergoing execution, wherein the first data structure is a shared data structure concurrently containing entries for instructions in multiple of the plurality of hardware threads; and a second data structure that records variable assignments between the plurality of architected logical registers and physical registers in the first level register file;

at dispatch of an instruction specifying a source logical register among the plurality of architected logical registers, the mapper initiating a swap of a first operand that is associated with the source logical register and that is held in the second level register file with a second operand in the first level register file and updating the second data structure accordingly; and thereafter, in response to a signal indicating the first operand is present in the first level register file, issuing the instruction for execution by the simulated processor.

* * * * *